Sept. 7, 1954  H. E. KNOPP ET AL  2,688,650
SEAL BETWEEN SOLIDIFIED MOLDED MATERIAL AND SOLID ELEMENT
EMBEDDED THEREIN AND METHOD OF FORMING THE SAME
Filed Nov. 24, 1950
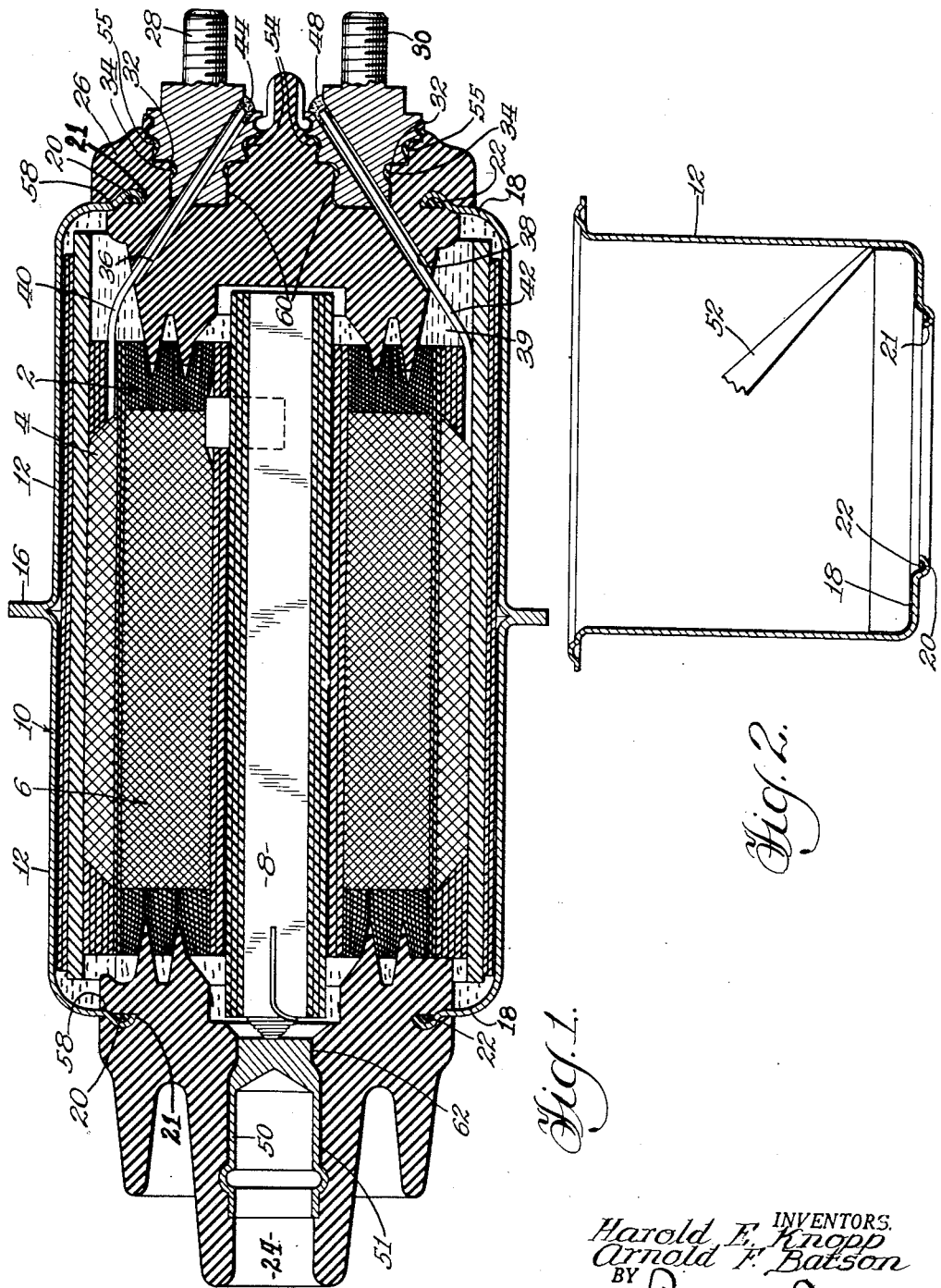
INVENTORS.
Harold E. Knopp
Arnold F. Batson
BY Paul O. Rippel
Atty.

Patented Sept. 7, 1954

2,688,650

UNITED STATES PATENT OFFICE 2,688,650

SEAL BETWEEN SOLIDIFIED MOLDED MATERIAL AND SOLID ELEMENT EMBEDDED THEREIN AND METHOD OF FORMING THE SAME

Harold E. Knopp, Chicago, and Arnold F. Batson, Frankfort, Ill., assignors to International Harvester Company, a corporation of New Jersey Application November 24, 1950, Serial No. 197,392

3 Claims. (Cl. 174—17.06)

This invention relates to a novel method and means for hermetically sealing a joint between a moldable plastic body and a solid body such as metal.

A general object of the invention is to provide a novel seal between such bodies or elements which is relatively inexpensive and simple to form and which provides an effective, durable hermetic seal therebetween.

A more specific object of the invention is to provide a novel gasket of resilient material, such as rubber, between such elements and to arrange the gasket in a manner that it remains in position during the molding of the plastic onto the metal for confinement by the plastic so that as the plastic shrinks during solidification the gasket is enclosed between the elements and an effective tight seal is obtained.

A further object of the invention is to form the gasket of expensive resilient material of a type which reacts with oil and as a result of such reaction is caused to swell in the confined space, thus further perfecting the seal between the plastic and solid elements.

The invention is especially adapted for use in ignition coils wherein the enclosing structure for the induction coil must provide a substantially perfect hermetically sealed enclosure for the coil and the oil dielectric therein.

A further object of the invention is to embed the metallic container within the plastic and locate the gasket in a position wherein it is completely encompassed by the plastic body whereby when the gasket is expanded it is caused to tightly engage the plastic body and the container to effect a tight seal therebetween and escape or bulging out of the gasket from the joint is positively precluded.

A further object of the invention is to provide a novel, simple and inexpensive method of forming such a hermetically sealed joint.

These and other objects of the invention will become more apparent from the specification and drawings, wherein:

Fig. 1 is an axial sectional view of an ignition coil incorporating the invention, and Fig. 2 is a sectional view comparable to Fig. 1 of one of the cup members forming the casing and illustrating the application of the rubber coating or lining thereto.

The invention is shown applied to an ignition coil which comprises an induction coil or essembly to be protected, generally designated 2, of usual construction and including an outer primary winding 4 and an inner secondary winding 6, which surrounds a laminated magnetizable core 8 preferably formed of soft iron strips.

The induction coil 2 is enclosed within a casing generally indicated 10, said casing comprising two complementary substantially identical cup shaped members 12, 12 which at their inner extremities are provided with outturned abutting flanges 16 seam or butt welded to form an integral structure. Each member 12, as best seen in Fig. 2, comprises an inturned flange 18 at its outer extremity, the flange 18 forming an endless edge portion and being bent outwardly and return bent inwardly at its inner periphery to form an inwardly facing annular channel 20 around the opening 21 therein.

The channel or groove 20 is filled with a resilient lining 22 of a type which is expansible when reacted with oil. Several examples of such types of rubber composition are as follows:

*Example No. 1*

Ingredients: Parts by weight
Smoked sheet or pale crepe rubber ___ 100
Sulphur (vulcanizing agent) _____ 14
Litharge (vulcanizing supplement) __ 14
Zinc oxide (vulcanizing supplement) _ 15
Tetramethyl-thiuram disulfide (vulcanizing accelerator) _____ 1
Sym. Di-beta-naphtyl-paraphenylene-diamine (prevents oxidation of the rubber or drying out thereof during baking) _____ 1.5
Mixture of an oil-soluble sulfonic acid of high molecular weight with a paraffin oil (rubber plasticizer) _____ 1
SRF black (coloring agent) _____ 1

To make the rubber coating cement use 60 grams of the mixture above and dissolve in 8 ounces of rubber solvent naphtha.

*Example No. 2*

Ingredients: Parts by weight
Group No. 1—
Smoked sheet or pale crepe rubber __ 30
Sulphur (vulcanizing agent) _____ 14
Litharge (vulcanizing supplement) _ 14
SRF black to color _____ 1

Group No. 2—
Smoked sheet or pale crepe rubber __ 30
Tetramethyl-thiuram disulfide (vulcanization accelerator) _____ 1
Zinc oxide (vulcanization supplement) _____ 15

To make rubber coating cement use equal parts of groups No. 1 and No. 2 (30 grams of each) and dissolve in 8 ounces of rubber solvent naphtha.

The rubber coating 22 is preferably allowed to air dry for approximately 8 hours and adheres to the metal. The coating is, of course, in an uncured state and is poured into or applied to the channel which forms a convenient receptacle or well into which the fluid coating may flow to form a relatively thick section.

Each flange 18 at the channel 20 and the lining or gasket 22 is embedded in a moldable plastic end body member or closure structure 24 or 26. The members 24 and 26 provide closures for opposite ends of the coil and close the openings 21 in the respective flanges 18 and are suitably formed to support the core 8 and the induction coil 2. The members 24 and 26 are formed of a moldable plastic thermosetting phenolic material, which in its hot fluid plastic state is forced into a suitable mold with the related cup 12 therein. The plastic flows around the inner and outer sides of the flange 18, and upon solidifying encompasses the gasket 22. The provision of the channel and the thick section of the gasket 22 therein insures that the gasket 22 will not be crushed or pinched out from between the embracing portions of the plastic and the flange 18 whereby the resilient lining 22 is under confinement and provides an effective seal. The heat of the plastic material when it is molded to the flange 18 vulcanizes the composition forming the gasket.

Member 26 is provided at its outer side with primary terminals 28 and 30, each terminal being formed adjacent to its inner end with a peripheral groove 32, which is filled or coated with a rubber or resilient lining to form a gasket 34 which is preferably of the same composition as the gasket 22. In actual practice the entire inner end of each terminal is coated by the rubber composition.

The terminals 28 and 30 are embedded in the plastic member 26 during the molding of the member 26 to the flange 18, the plastic being molded around the terminals when forced into the mold. A seal is effected around the terminals with the member 26 by the embracement of the plastic material forming said member 26.

The member 26 is provided with passageways 36 and 38 which are open to the space within the casing 10, the passageways 36 and 38 being drilled through the respective terminals 28 and 30. One lead 40 of the primary winding extends through the passage 36 and the other lead 42 extends through the passage 38.

All of the voids between the insulation of the coil 2 and the space in the coil not occupied by solid material are filled with insulating oil 39. In the construction of the coil after the flanges 16 have been hermetically joined together, the coil is heated and the ends of the leads 40 and 42 are soldered as at 44 and 46 to the terminals 28 and 30 respectively to seal the outlets therein. The ignition coil and oil are heated prior to soldering to drive out the moisture in a well-known manner.

The secondary winding has one lead connected to the one primary lead and its other lead connected to the core 8 which is connected to a female plug 50 which is embedded within the center of the member 24 and coated with a rubber lining 51 of the same composition as 34 and 22.

The novel method for forming the novel sealed joints between each flange 18 and the plastic member joined therewith and between the terminals 28 and 30 and the member 26 and plug 50 and member 24 is extremely simple. The resilient coating is applied to the interior of each member 12 and allowed to flow along the inner surface of the flange 18 and fill the channel 20. It will be understood that the member 12 is positioned upright with the flange 18 and the chamber 20 at the bottom thereof. This provides a wick from gasket 22 to the interior of the container. The lining may be applied in any manner as by a brush or spraying, etc., or through a spout 52 as shown in Fig. 2 of a suitable container (not shown). Each primary terminal 28 and 30 may be coated around its inner extremity and to fill the groove 32 thereof. It will be seen that each terminal may have a groove 54 outwardly of groove 32 which may also be filled with the rubber coating 55 the same as 34. The inner extremity of each terminal may be knurled in order to provide a mechanical lock with the member 26. The resilient coating on the members 12, 28, 30 and 50 is preferably air dried for a period of about 8 hours; however, to accelerate drying of the rubber coating it may be air dried for about 1 hour and then baked for about 2½ hours at about 300° F. Then the member 12 and the terminals 28 and 30 may be placed in a suitable mold and the plastic forming the member 26 may be forced into the mold to the contour shown. The plastic material upon solidifying contracts against the members 28 and 30 as well as the inner and outer sides of the flange 18 and embraces the confined gaskets 34 and 22. It will be understood that member 24 is similarly molded to the related member 12 and the plug 50. The passageways 36 and 38 are then drilled through the terminals 28 and 30 and member 26 as shown. The members 12, 12 and the remaining parts of the coil are assembled as heretofore described.

The arrangement herein described has been tested and found to provide an effective hermetic seal. It has also been found that the coaction between the seals and the oil, such as may seep in the seams at 58 or 60 or 62, caused the resilient lining to swell which further perfects the seal. The thin sections of the rubber at 58, 60, and 62 serve as wicks and extend from the oil filled container to the thick sections. It will be understood that although in the present instance oil is used as the swelling agent, in other applications some other agent, such as kerosene or gasoline may be used to swell the sealing material in the confined spaces in the joint.

We claim:

1. The combination with a fluid filled container having an inturned annular flange presenting an inner peripheral edge defining an opening through the flange, said flange having an external side facing outwardly of said container and an internal side with a continuous circular channel completely encircling said opening about said inner periphery and facing into said container, a one-piece closure element complementally fitting through said opening and having integral, continuous, solid portions extending therefrom along opposite sides of said opening completely thereabout and embracing said flange therebetween, one of said portions complementally fitting directly against said external side of said flange and the other of said portions complementally fitting against the internal side of said flange about said channel and defining the sole seepage passage with said flange from the container to said channel, and an endless gasket within the channel compressed and wholly confined between said flange and said one portion of said closure member, said gasket composed of material expansible upon contact by subjection to said fluid in said container attendant to the seeping thereof through said passage into said channel whereby perfecting the seal between said closure member and said flange.

2. A hermetic seal in a joint between a metallic container housing filled with predetermined liquid, the housing having a peripheral edge circumscribing an opening, a plastic one-piece closure member having a body disposed in closing relationship to said opening and having peripheral contiguity with said edge and thereat having spaced, continuous, integral endless portions embracing said container housing therebetween, said portions extending from said body portion away from said edge, one of said portions extending into said container and defining with an opposed side of the housing the only passage into said container and adapted to pass said fluid from said container to said edge, and a continuous sealing gasket about said opening entirely confined between one of said portions and said housing at said edge only and formed of material characterized by expanding upon subjection to said liquid whereby to perfect the seal between said housing and said closure member.

3. In a method of forming a seal in a joint between a plastic body and a metallic body embedded therein, the steps of applying a coating of resilient rubber material in an uncured state to said metallic body at the joint, then molding the plastic body while in a hot fluid state onto said metallic body to confine said resilient material whereby the heat in the plastic body is caused to cure and vulcanize said resilient material.

4. A method of forming a seal in a joint between a solid body and a plastic body, the steps comprising, placing the plastic body in a hot moldable state, then forming a resilient lining on said solid body at said joint, then at said joint embedding said solid body with said lining in said plastic body to confine said lining between said bodies and to provide a passage seam between said bodies to said lining, then allowing said plastic body to solidify, and then subjecting said lining to a reacting agent by seepage through said seam and thereby causing said lining to expand.

5. The combination with a metallic casing having an endless grooved edge portion, a plastic closure member having spaced portions receiving and tightly embracing said edge portion therebetween, a resilient gasket having a relatively thick section within the groove in said edge portion and compressed between the edge portion and an opposed portion of the closure member and having an integral thinner section extending from said thick section between said edge portion and opposed portion of the closure member into said container, said gasket being formed of material reactable with oil and the like adapted to be enclosed within the container and transmittable to said thick section by said thinner whereby said gasket is caused to expand and thereby effect a hermetic seal between said edge portion and said closure member.

6. The combination of a metallic terminal element with a groove therearound and a closely surrounding plastic casing closure, a lining interposed and in snug embracement between said terminal element and said closure and comprising a relatively thick section of lining in said groove and a substantially thinner section of lining extending from the groove about the adjacent end of said element, said closure being apertured through the side thereof facing into the associated casing, the aperture extending through said thinner section of said lining and through said end of said terminal element, said lining being formed of material reactable with oil adapted to be contained in said casing and to conduct such oil to said groove to expand the material therein whereby to effect a hermetic seal between the element and said closure.

7. The combination of a metallic container having an inturned peripheral flange at each end, a closure member extending into each flange, an assembly to be protected disposed within the container supported between said members, each member comprising spaced portions along the inner and outer side of the related flange and closely embracing the same, a resilient gasket closely confined between the inner side of each flange and the opposed portion of the related closure member, and insulating fluid within the container adapted to seep to each gasket and react therewith to expand the same whereby said gaskets hermetically seal said closure members with said container, said gaskets upon swelling concomitantly exerting a force upon said members inwardly with respect to said container.

8. The combination of a container having an opening with a circumscribing peripheral flange, said container adapted to enclose an assembly to be protected, an insulating fluid completely filling the spaces in said container not occupied by such assembly, a closure member snugly fitting into the opening and having an integral portion circumferentially coextensive with the flange and disposed within the container in opposing relationship to the interior side of the flange and minutely spaced therefrom and defining a fluid seepage passage therewith, a continuous resilient rubber compound sealing element interposed between said interior side of the flange and said portion and exposed to the container via said seepage passage, said fluid and element characterized to react with each other to effect swelling of the element pursuant to said fluid seeping through said passage to said element, said element upon reaction expanding between the flange and said portion of said member and urging said member into the container against the compressive resistance of the fluid for maintaining said fluid under pressure within the container.

References Cited in the file of this patent

UNITED STATES PATENTS

| Number | Name | Date |
|---|---|---|
| 1,198,166 | Stoddard | Sept. 12, 1916 |
| 1,218,596 | Conklin | Mar. 6, 1917 |
| 1,767,612 | Pieper | June 24, 1930 |
| 1,924,435 | Homer | Aug. 29, 1933 |
| 1,952,036 | Dillhoefer, Jr. | Mar. 30, 1934 |
| 2,219,573 | Fraenckel | Oct. 29, 1940 |
| 2,249,091 | Robinson | July 15, 1941 |
| 2,318,589 | Barnette | May 11, 1943 |
| 2,416,148 | Borgerd et al. | Feb. 18, 1947 |
| 2,512,796 | Hartzell | June 27, 1950 |
| 2,591,044 | Bomhardt et al. | Apr. 1, 1952 |